Sept. 15, 1970
F. L. SIMPSON
3,528,230
COTTON HARVESTER WITH REMOVABLE BASKET
AND TRANSPORT VEHICLE THEREFOR
Filed May 16, 1968
3 Sheets-Sheet 1
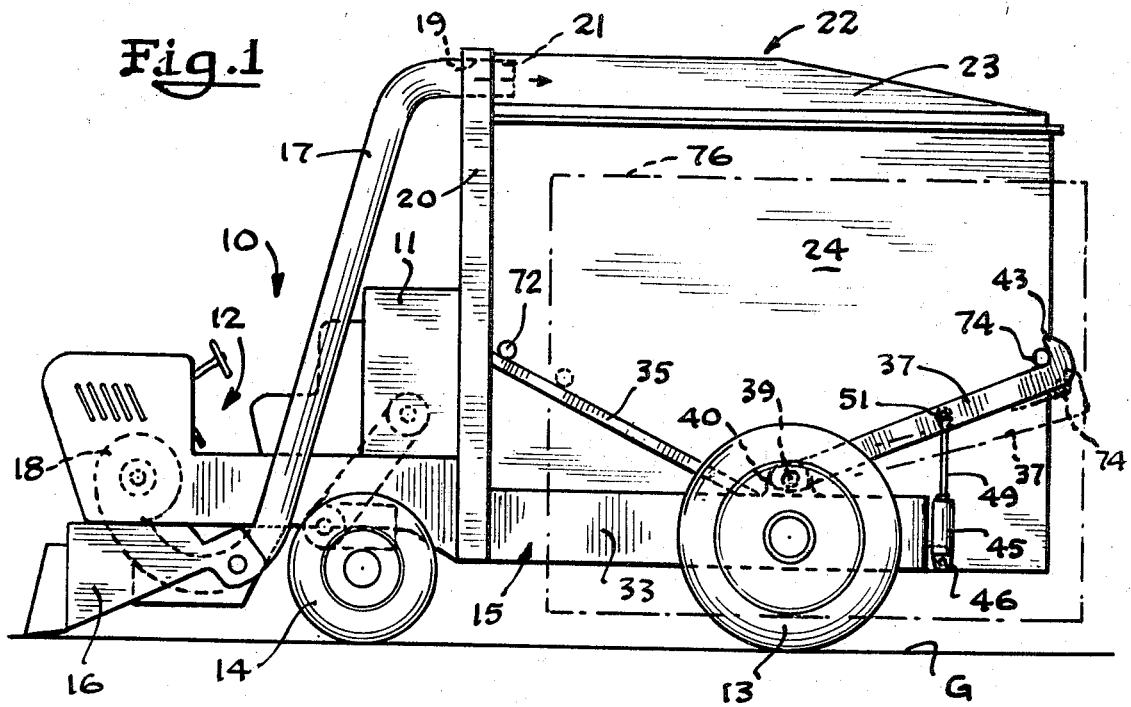
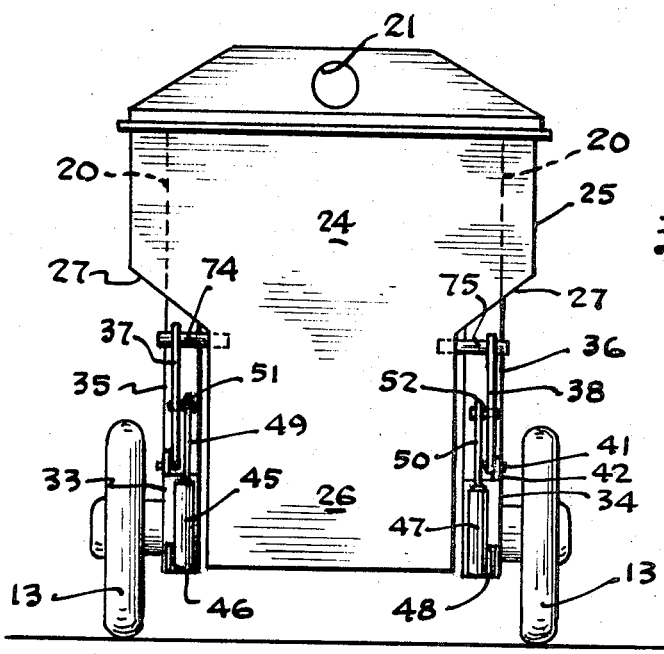
Inventor
Forrest L. Simpson
By John J. Komaiia
Attorney

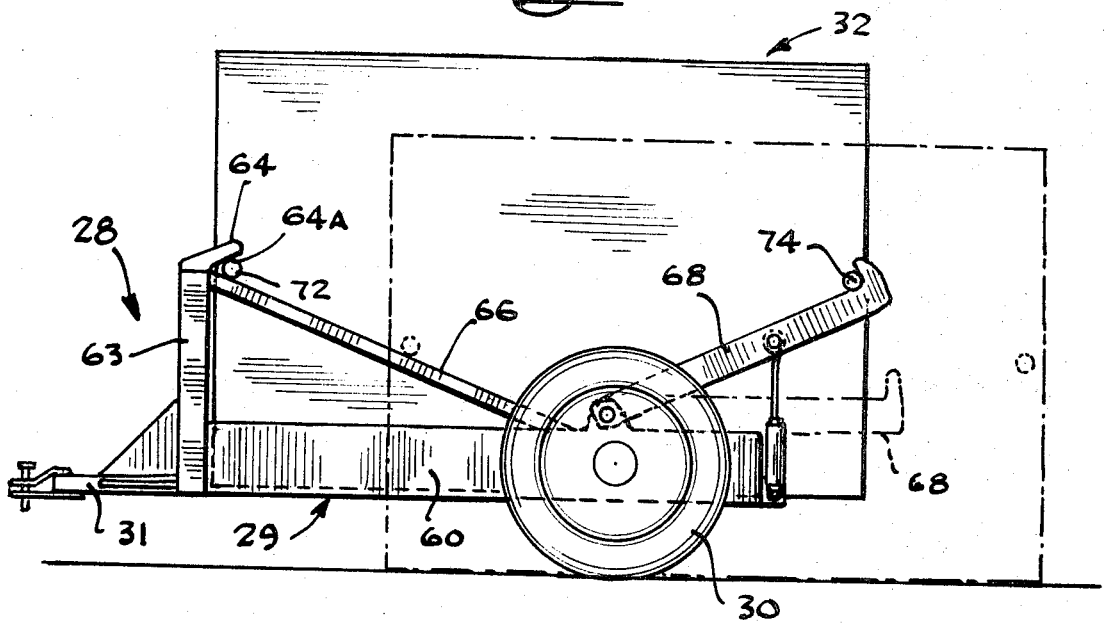

Sept. 15, 1970  F. L. SIMPSON  3,528,230
COTTON HARVESTER WITH REMOVABLE BASKET
AND TRANSPORT VEHICLE THEREFOR
Filed May 16, 1968  3 Sheets-Sheet 3

Inventor
Forrest L. Simpson
By John J. Kowalik
Attorney

United States Patent Office 3,528,230
Patented Sept. 15, 1970

3,528,230
COTTON HARVESTER WITH REMOVABLE
BASKET AND TRANSPORT VEHICLE
THEREFOR
Forrest L. Simpson, Memphis, Tenn., assignor to International Harvester Company, Chicago, Ill., a corporation of Delaware
Filed May 16, 1968, Ser. No. 729,682
Int. Cl. A01d 45/18
U.S. Cl. 56—14                              10 Claims

ABSTRACT OF THE DISCLOSURE

A system and combination of a vehicle carrier and a cotton basket for transporting the basket during field harvesting, for transporting the basket to a transfer station, and for picking up the basket at the transfer station for transport to a processing station. Vehicle carriers are provided as cotton harvesters and as carts, with both carriers having means for engaging the basket when grounded, for lifting the basket, and for lowering the basket to ground position. The basket has lateral projections which contact cams at the forward end of the carriers, and other lateral projections which are engageable by pivotable means mounted at the back of the carriers. Such pivotable means lift the basket and hold the basket in raised position during transport.

---

This invention relates to a cotton basket transport system and to vehicle carrier structures and cotton basket structures which are used to advantage in practicing the system of cotton transport. Cotton harvester mechanisms are widely used for picking cotton in the field, which cotton is delivered to the basket which forms part of the harvester. Such cotton harvesters include a picking unit generally disposed in advance of the cotton harvester, which unit picks up the cotton and conveys it under the force of a positive pressure into a conduit which conveys such cotton to the basket mounted on the harvester.

The present invention is principally concerned with the features of transporting said cotton basket from the cotton harvester to a cart of the type widely used for moving the baskets to the processing stations such as a cotton gin. A successful attainment of such features are highly desirable because expensive cotton harvesting mechanisms and vehicle carriers are unduly tied up while the cotton is either emptied from the basket or the basket is demounted from the cotton harvester. So long as the expensive and sophisticated cotton harvesting mechanisms are standing while such cotton or basket is being transferred, no further use or exploitation of the harvester may be realized in the cotton fields. If a cotton basket is demounted from the cotton harvester, then attention must be directed to the careful mounting of said basket onto the familiar carts, which transfer is made at a transfer station or a processing station. Not only is there a problem about the actual transfer of the cotton or the basket, but there is the additional problem of the time and labor involved in effecting such a transfer.

Accordingly, one important object of the present invention is a system wherein cotton harvester and cart vehicle carriers are used to advantage to harvest cotton into a basket, to deposit the basket at a transfer station, to pick up the basket at that point, and to deliver the basket to a processing station without requiring specialized transport equipment and materials, or extra labor demands.

Yet another important object of this invention is a system of transporting cotton baskets wherein similar means are provided on different vehicle carriers for engaging a grounded cotton basket, for lifting such a basket onto the carrier, and for holding the basket on the carrier during transport in the field to harvest cotton, and during transport to transfer and processing stations.

Still another important object of the invention is a vehicle carrier and cotton basket combination in which cooperative means are provided to allow the basket to be efficiently engaged, lifted and held on the carrier during transport.

A still further important object of the invention is a vehicle carrier and cotton basket combination in which the basket is transported on a cotton harvester, and is then deposited at a transfer station by utilizing only the means provided on the carrier and a single operator of said carrier.

Yet another important object of the invention is a vehicle carrier and cotton basket combination in which the cotton basket is picked up at transfer station by a cart and moved to a processing station by utilizing only the means provided on the vehicle carrier and a single operator of said carrier.

Yet another object of the invention is a vehicle carrier and cotton basket combination in which the basket is provided with projecting members which are cooperatively engaged by pivotable members on the vehicle carrier to move the basket to raised position after another set of projecting members on the basket engage cam means provided on the vehicle carrier.

The cotton transport system of the invention more particularly provides utilizing a cotton harvester vehicle carrier and a cart vehicle carrier, both of which are provided with similar means to cooperatively engage and manipulate a cotton basket which can be moved to mountable operative position on the carrier, and can also be demounted to ground contacting position, free of said vehicle carrier. Such means include a rearward frame structure on the vehicle carrier having an open end so that the frame structure can be moved around three sides of the cotton basket. The cotton basket is provided with a forward set of laterally projecting pins towards the other end of the basket. Pivotable means on the frame structure are actuated to engage the rearward set of pins to lift the basket to operative mountable position by the cooperation of the forward set of laterally projecting pins which ride cams provided on the vehicle. If the basket is to be lowered at a transport station, or the like, the pivotal means are lowered, whereupon the forward laterally projecting pins ride down the cams towards low surfaces which define the demounted position when the basket contacts the ground. Upon ground contact, the vehicle carrier is moved away from the basket so that another vehicle carrier can be moved to surround the basket on three sides and again lift the basket to operative mountable position.

Still another object is a vehicle carrier assembly and system which efficiently eliminates the stopping time of the harvester in the field for transferring the cotton in the basket to thereby increase the operational efficiency.

Still another important object is to provide a novel structure and device on the vehicle carrier which quickly and efficiently cooperates with a specially devised basket to remove a filled basket, as from a cotton harvester, to the ground, and thereafter immediately lift a new empty basket into operable mountable position without substantially interfering with the cotton harvesting time of the harvester.

Another important object is the provision of novel and efficient means on a vehicle carrier, such as a cart, which can quickly engage and lift a ground deposited basket into operable mountable position for transfer to a processing station. The basket may then be deposited to free the cart for a subsequent pickup of a filled basket.

These and other objects and advantages inherent in and encompassed by the invention will become more readily apparent from the specification and the drawings, wherein:

FIG. 1 is a somewhat diagrammatic side elevational view of a cotton harvester vehicle and cotton basket assembly;

FIG. 2 is a back elevational view of the harvester shown in FIG. 1;

FIG. 3 is a somewhat diagrammatic side elevational view of a cart vehicle and cotton basket assembly;

FIG. 4 is a top plan view of the cart shown in FIG 3; and

Figure 5A:
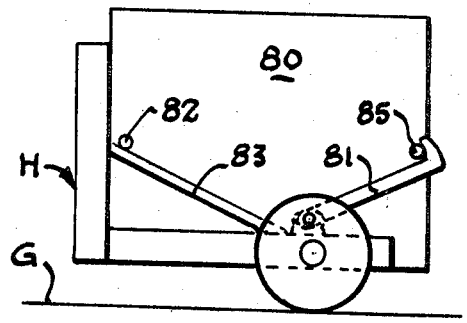
FIGS. 5A–5G are highly diagrammatic depictions of the vehicle carriers in operation with a cotton basket in the practice of a system leading to improved transport of the cotton baskets.

The cotton harvester of FIG. 1 is generally of a known type with known features including a vehicle shown generally as 10, including conventional power unit 11, control assembly 12, ground contacting traction wheels 13 and power and steering wheel 14, said wheels being rotatably mounted on a frame structure indicated generally at 15. The harvester has a cotton picking unit 16 positioned in advance of the vehicle, and a cotton conveying conduit 17 is joined to the picking unit. A fan 18 conveys the cotton from the picking unit under positive pressure through the conduit 17 to a cotton entry 19 in upright member 20 of the frame structure. The entry 19 in the frame structure is in registry with an entry or inlet 21 of a cotton basket shown generally as 22.

The cotton discharges into a tunnel structure 23 of the cotton basket, and is thereafter deposited in the interior 24 of the basket. Except as will be particularly described herein, the basket is of a conventional structure and is shown as having a generally enlarged upper part 25, and a smaller width lower part 26 joined by laterally sloping walls 27. The basket and cotton harvester indicated herein may have conventional structures and parts, of which representative details may be seen, for example, in issued U.S. Letters Pat. No. 3,214,222. Likewise, representative details of known cotton harvesters may be ascertained by reference to the same U.S. Letters Patent.

Advantages of the invention are most fully realized by utilizing the cotton harvester of FIGS. 1 and 2 in conjunction with a cotton basket cart shown generally at 28 in FIGS. 3 and 4. The cart includes a frame structure shown generally at 29 to which is rotatably mounted traction wheels 30, and which may have a hitching link assembly 31 at the forward end. An electric cart or tractor, or the like, may be coupled for transporting the cart and basket, which basket is diagrammatically indicated at 32. The frame structure 29 of the cart and 15 of the cotton harvester are provided with similar means by which the invention may be successfully practiced, and the common features of such means will be particularly described by reference to the cotton harvester of FIGS. 1 and 2, although it is understood that such description will likewise apply to the cotton basket cart of FIGS. 3 and 4.

The vehicle carriers have substantially rigid spaced side members 33 and 34 which are spaced apart a width sufficient to accommodate the width of the lower part 26 of the cotton basket. To each side of the frame structure is mounted a cam such as 35 and 36, such cam shown as a rigid member secured at one end to the top of the side member and at the other end to the upright member 20. Such cam has a high surface towards the upright member 20 and a low surface towards the top of the side member 33 or 34. As shown, said cam is positioned on each side frame towards the forward end of the vehicle carrier or frame structure. The cams on both side frames are of similar configuration.

Also mounted on each side frame is a pivotable member or latch such as 37 and 38. One end of the latch is pivoted to a pin such as 39 which is secured to a bracket or trunnion 40 secured to the top of side frame 33. Latch 38 on side frame 34 is likewise pivoted to a pin 41 secured to bracket or trunnion 42 fixed to the top of that side member. The other ends of the latches are formed as upright abutting parts or hooks such as shown at 43 on latch 37.

The ends such as 43 of the latches follow a radial path when such latches are raised and lowered around the pivot at 39, 40. Such latches are moved by means which are shown as cylinders such as 45 secured to bracket 46 fixed to the end of side frame 33, and cylinder 47 which is similarly secured to bracket 48 fixed to the end of side frame 34. The rams 49 and 50 of the cylinders are shown as being secured at their free ends to inside points of the latches by fasteners 51 and 52. It will be understood that such cylinders are actuated by fluid means such as hydraulic fluid or air through connecting lines and controls which, however, are not shown.

The cotton basket cart of FIGS. 3 and 4 has means similar to those disclosed in FIGS. 1 and 2 for practicing the invention, and only brief reference will be made to such features since the previous description will likewise apply to such features. The rigid side members are seen at 60 and 61, and they are secured in normal relation to an upright member or end wall 63. Spaced at the opposite ends on top of said end wall are stops or abutting members 64 and 65, each of which has an arcuate undercut surface such as 66 on stop 64 to intercept and stop a moving cylindrical member, as will be brought out in greater detail later.

The cart 28 has spaced cams 66 and 67, latches 68 and 69 pivoted to the tops of the spaced side members, and cylinders 69 and 70 secured to the ends of the side members, and having rams secured to the insides of the latches.

The cotton basket cart of FIGS. 3 and 4 can transport and handle the same cotton basket illustrated in FIGS. 1 and 2. As stated, such basket may have many conventional features, but is provided with an entry 21 which can be placed in registry with an entry 19 in the upright member or end wall 20 of the cotton harvester. Such basket is also provided with means to allow such basket to cooperatively operate with the illustrated vehicle carriers. Such means include a forward pair of lateral projecting members or pins 72 and 73, and a rearward pair of projecting members or pins 74 and 75, as best seen in the plan view of FIG. 4. Pins on each side of the basket are substantially colinear along the line which is parallel to the bottom plane of the cotton basket. The four pins on opposite sides of the basket are preferably positioned so they lie in a plane which is parallel to the bottom plane of the cotton basket. The pins extend outwardly from the surface of their adjoining sides a distance sufficient to engage the cam surfaces (forward pins) and to be engaged by the latches (rearward pins).

It will be evident from the view of FIG. 1 that the basket can be lowered to a position closer to the ground line G when the cylinder 45 is actuated, as indicated in phantom at 76. It will be further evident from the view of FIG. 3 that when a latch, such as 68, on the cart is fully lowered, the longitudinal axes of both the latch and its adjoining side frame 60 will be parallel, the basket will be grounded, and the upturned portion or hook of the latch will be below and clear of the rearward pin so that the cart can be pulled away from the grounded basket.

Figure 5B:
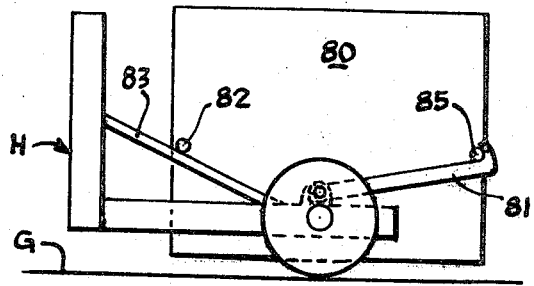
Figure 5C:
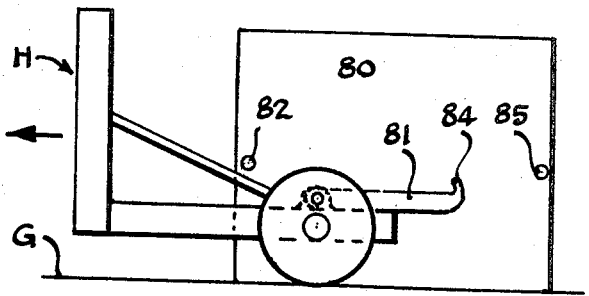
Figure 5D:
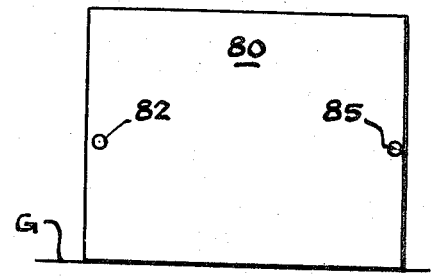
Figure 5E:
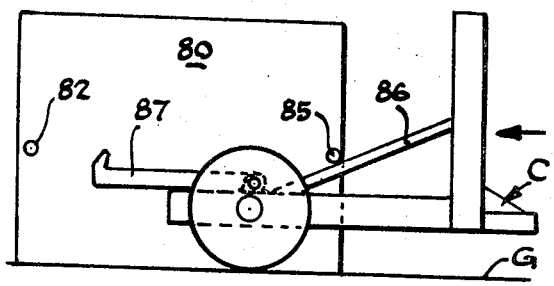
Figure 5F:
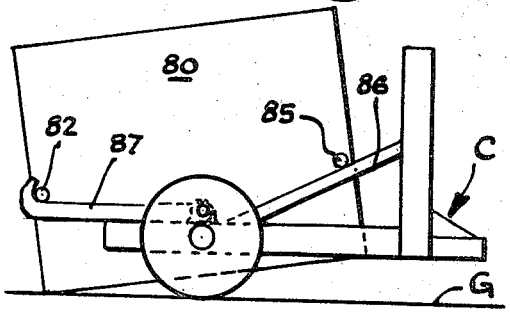
Figure 5G:
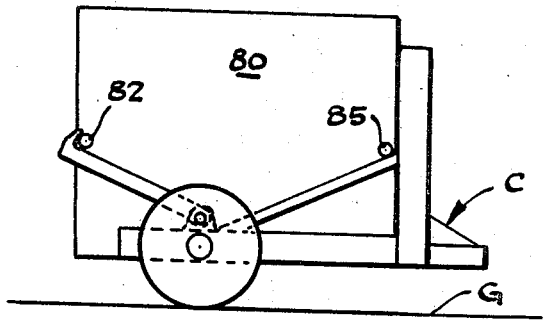

The system or method for transporting the disclosed cotton basket is shown by reference to the diagrammatic representations of FIG. 5. Step A depicts a cotton basket 80 operatively mounted on a cotton harvester H, the bottom of said mounted basket being spaced from the ground line G. After the basket is desirably filled in the field, the rearward latches are lowered, as indicated by latch 81 in step B. As the latches lower to the illustrated position, the bottom of the cotton basket approaches the ground line G and the forward pins, such as pin 82, move down the cam 83 towards the low surface of said cam. The cotton basket is fully lowered or grounded, as indicated in step C, when the latches, such as 81, are fully lowered so that the hooks, such as 84, are below and clear the rearward pins such as 85. The harvester vehicle may then be driven in a forward direction, as indicated by the arrow, until the cart moves entirely away from the cotton basket, as indicated in step D.

The deposited basket 80 on the ground line G may be considered as a transfer station at which the basket is transferred to a cotton basket cart C, as indicated in the succeeding steps. Step E shows the cart C being moved in a rearward direction, as indicated by the arrow, until the rearward pins, such as 85, contact the surface of the cam such as 86. It will be seen that the pins 85 are rearward pins relative to the cotton harvester, but are forward pins relative to the cart. In this position, the cotton basket 80 is surrounded on three sides by the frame structure of the cart C.

The latches such as latch 87 are then positioned to engage the pins such as 82 when such latch is raised. If the rearward pins are beyond the hook terminuses of the latches, the basket may be tilted by moving the vehicle until the forward pins move up the cams, and the bottom end of the basket by the cams is raised from the ground line. This is indicated in step F where the rearward pins have been moved to a position where they will be engageable by the hook terminus of each latch. It should be understood that such a tilting step will be provided where the slope of the cam is moderate relative to the front to back dimensions of the basket and the vehicle frame structure. For a given basket and frame structure size, a sufficiently greater slope or incline will permit the latches to underlie the rear pins without tilting the basket. Particular designs can be readily devised by practioners.

Again, the pins such as 82 are forward pins relative to the cotton harvester, but rearward pins relative to the cart. As the pins such as 85 are urged up the cams towards the high surface, the basket is raised from the ground line G until the basket is fully raised to operable mounted position, as indicated in step G. The basket is fully mounted when the pins such as 85 are intercepted by stops or abutting members, which are indicated at 64 and 65 in FIG. 4. The mounted basket may then be transported on the cart to a processing station, such as a cotton gin.

The invention may now be practiced in the various ways which will occur to practitioners, and it is intended that all such practice comprise a part of the invention so long as it falls within the scope of the terms in the appended claims as given further meaning by the language of the preceding specification.

What is claimed is:

1. In a cotton harvester having a harvesting component and means for conveying the crops upwardly and rearwardly therefrom and having a mobile frame comprising a pair of side members defining an open-ended basket accommodation space therebetween and a cover spaced vertically above said space communicating with the conveying means, an open top basket separable from the harvester removably mounted between said side members in position to receive harvested crops from said conveying means, and cooperating means on one end of the basket and frame for camming said basket from the ground onto the frame and swingable means on the frame and cooperating means on the other end of the basket for lifting that end of the basket off the ground and concomitantly effecting camming lifting action of said means at the one end of the basket and frame for mounting the basket on the frame under the cover, said swingable means reversely movable for lowering the basket to the ground for dismounting the basket therefrom.

2. The cotton harvester comprising the elements of claim 1, wherein said means for camming the basket includes cooperative cam means on said side members and opposite sides of the basket, said cam means on the side members providing upwardly sloping cam surfaces.

3. The cotton harvester comprising the elements of claim 2, wherein said swingable means for urging the basket up said cam surfaces includes pivotable means mounted on said side members and means on opposite sides of the basket which are engageable by said pivotable means, and means mounted on said side members to actuate said pivotable means into engagement and disengagement with said means on opposite sides of said basket.

4. In a cotton harvester having a harvesting component and means for conveying the crops upwardly and rearwardly therefrom and having a mobile frame comprising a pair of side members defining an open-ended basket accommodation space therebetween, a basket removably mounted between said side members in position to receive harvested crops from said conveying means, and means on the basket and frame for elevating said basket from the ground onto the frame for mounting the basket thereon and for lowering the basket to the ground for dismounting the basket therefrom, wherein said means for elevating and lowering the basket includes cooperative cam means on said side members and opposite sides of the basket, said cam means on the side members providing upwardly sloping cam surfaces, and means for urging the basket up said cam surfaces to mounted position, wherein said means for urging the basket up said cam surfaces includes pivotable means mounted on said side members and means on opposite sides of the basket which are engageable by said pivotable means and means mounted on said side members to actuate said pivotable means into engagement and disengagement with said means on opposite sides of said basket, and wherein said pivotable means mounted on said side members include a latch on each side member, one end of said latch being pivoted to the side member and the other end in the form of a hook-like terminus, said means on opposite sides of the basket which are engageable by said pivotable means being laterally projecting pins, and said actuating means being secured to said latches to thereby raise, hold and to lower the basket.

5. The cotton harvester comprising the elements of claim 4, wherein said actuating means include rams connected between the side frame members and the latches.

6. The cotton harvester comprising the elements of claim 1, said cotton harvester being a part of an assembly which further includes a removal vehicle, said removal vehicle comprising a pair of side members defining an open-ended basket accommodation space therebetween, and means on said removal vehicle which cooperate with said means on said basket for lifting said basket from the ground onto the frame of the removal vehicle for mounting the basket thereon and for lowering the basket to the ground for dismounting the basket therefrom.

7. The cotton harvester and removal vehicle assembly comprising the elements of claim 6, wherein said mobile frame and said removal vehicle have similar means on the respective side members thereof which cooperate in similar ways with the means on said basket for similarly lifting said basket onto said side members for mounting the basket thereon and for similarly lowering the basket to the ground for dismounting the basket from said side members.

8. In a cotton harvester having a harvesting component and means for conveying the crops upwardly and rearwardly therefrom and having a mobile frame comprising a pair of side members defining an open-ended basket accommodation space therebetween, a basket removably mounted between said side members in position to receive harvested crops from said conveying means, and means on the basket and frame for elevating said basket from the ground onto the frame for mounting the basket thereon and for lowering the basket to the ground for dismounting the basket therefrom, said cotton harvester being a part of an assembly which further includes a removal vehicle, said removal vehicle comprising a pair of side members defining an open-ended basket accommodation space therebetween, and means on said removal vehicle which cooperate with said means on said basket for elevating said basket from the ground onto the frame of the removal vehicle for mounting the basket thereon and for lowering the basket to the ground for dismounting the basket therefrom, wherein said mobile frame and said removal vehicle have similar means on the respective side members thereof which cooperate in similar ways with the means on said basket for similarly elevating said basket onto said side members for mounting the basket thereon and for similarly lowering the basket to the ground for dismounting the basket from said side members, and wherein the means for similarly elevating and lowering the basket include on the side members of each of the mobile frame and the removal vehicle cam means at one end of said side members, one on each side of a mounted basket, latch members directed towards the opposite end of the side members, one on each side of a mounted basket, means to actuate each latch member, one end of each latch member being pivoted to the side member and the free end following an arcuate path during actuation, a first pair of lateral pins directed towards one end of the basket, one on each side of the basket, and a second pair of lateral pins directed towards the opposite end of the basket, one on each side of the basket, whereby said latch members engage one of said pairs of pins to urge the basket to the high surfaces of said cam means as the other of said pairs of pins move up said surfaces of said cam means.

9. The cotton harvester comprising the elements of claim 1, wherein the means on the basket include a first pair of lateral pins adjacent to one end of the basket, one on each side of the basket, a second pair of lateral pins adjacent to the opposite end of the basket, one on each side of the basket, and wherein the means on the frame include a cam having a sloping surface on each side member and directed towards one end of the frame, said swingable means comprising a latch member pivoted to each side member and directed towards the opposite end of the frame, and means mounted on each side member to actuate said latch members so they follow an arcuate path in engaging one of said pairs of lateral pins on the basket as the other of said pairs of lateral pins engage the sloping surfaces of said cams.

10. In a cotton harvester having a harvesting component and means for conveying the crops upwardly and rearwardly therefrom and having a mobile frame comprising a pair of side members defining an open-ended basket accommodation space therebetween, a basket removably mounted between said side members in position to receive harvested crops from said conveying means, and means on the basket and frame for elevating said basket from the ground onto the frame for mounting the basket thereon and for lowering the basket to the ground for dismounting the basket therefrom, wherein the means on the basket include a first pair of lateral pins directed towards one end of the basket, one on each side of the basket, a second pair of lateral pins directed towards the opposite end of the basket, one on each side of the basket, and wherein the means on the frame include a cam having a sloping surface on each side member and directed towards one end of the frame, a latch member pivoted to each side member and directed towards the opposite end of the frame, and means mounted on each side member to actuate said latch members so they follow an arcuate path in engaging one of said pairs of lateral pins on the basket as the other of said pairs of lateral pins engage the sloping surfaces of said cams, and wherein the actuating means include a ram mounted on each side member towards the ends where the latch members are pivoted, and each ram being secured to the latch member pivoted on that side member by means which allow said latch members to be raised and lowered when said rams are actuated.

References Cited

UNITED STATES PATENTS

| | | | |
|---|---|---|---|
| 2,138,485 | 11/1929 | Faries | 314—38.44 XR |
| 2,215,529 | 9/1940 | Nazarko | 215—515 |
| 2,869,306 | 1/1959 | Hagen | 56—14 |

ROBERT PESHOCK, Primary Examiner